US010132945B2

(12) United States Patent
Thore et al.

(10) Patent No.: US 10,132,945 B2
(45) Date of Patent: Nov. 20, 2018

(54) METHOD FOR OBTAINING ESTIMATES OF A MODEL PARAMETER SO AS TO CHARACTERISE THE EVOLUTION OF A SUBSURFACE VOLUME

(71) Applicant: Total S.A., Courbevoie (FR)

(72) Inventors: Pierre Daniel Thore, Pau (FR); Jonathan Anthony Edgar, Laurencekirk (GB)

(73) Assignee: Total S.A., Courbevoie (FR)

( * ) Notice: Subject to any disclaimer, the term of this patent is extended or adjusted under 35 U.S.C. 154(b) by 0 days.

(21) Appl. No.: 15/324,284

(22) PCT Filed: Jul. 10, 2015

(86) PCT No.: PCT/EP2015/065908
§ 371 (c)(1),
(2) Date: Jan. 6, 2017

(87) PCT Pub. No.: WO2016/005597
PCT Pub. Date: Jan. 14, 2016

(65) Prior Publication Data
US 2017/0205521 A1    Jul. 20, 2017

(30) Foreign Application Priority Data

Jul. 11, 2014   (GB) .................................. 1412400.2

(51) Int. Cl.
*G01V 1/30*   (2006.01)
*G01V 1/28*   (2006.01)

(52) U.S. Cl.
CPC .............. *G01V 1/308* (2013.01); *G01V 1/282* (2013.01); *G01V 2210/612* (2013.01); *G01V 2210/624* (2013.01)

(58) Field of Classification Search
CPC .......... G01V 1/308; G01V 1/32; G01V 1/325; G01V 1/364; G01V 1/368; G01V 1/282;
(Continued)

(56) References Cited

U.S. PATENT DOCUMENTS

| 4,964,088 A | 10/1990 | Chittineni |
| 8,705,317 B2 | 4/2014 | Houck et al. |

(Continued)

FOREIGN PATENT DOCUMENTS

| EP | 1865340 A1 | 12/2007 |
| EP | 1865340 B1 | 9/2010 |

(Continued)

OTHER PUBLICATIONS

Fomel et al., Model Preconditioning by Plane-Wave Construction in Geophysical Estimation Problems, 2005 Annual Meeting SEG/Houston, pp. 2601-2604.*

(Continued)

*Primary Examiner* — Toan Le
(74) *Attorney, Agent, or Firm* — Winstead PC

(57) ABSTRACT

Disclosed is a method for characterizing the evolution of a sub-surface volume. The method comprises providing a first and second surveys of the reservoir with a first and second sets of seismic traces, constructing an analytic filter operable to shift one or more seismic traces in dependence of a model parameter; and performing an inversion to obtain estimates of the model parameter such that the analytic filter aligns said first survey and said second survey. The analytic filter may be a plane wave destruction filter, and be such that the model parameter is a function of the analytic filter and is not a function of one or more of said second set of seismic traces.

21 Claims, 4 Drawing Sheets

(58) Field of Classification Search
CPC .............. G01V 1/28; G01V 2210/612; G01V 2210/624
See application file for complete search history.

(56) References Cited

U.S. PATENT DOCUMENTS

| | | |
|---|---|---|
| 2003/0043693 A1 | 3/2003 | Eastwood et al. |
| 2009/0043554 A1 | 2/2009 | Horne et al. |
| 2010/0177595 A1 | 7/2010 | Khare et al. |
| 2014/0019056 A1 | 1/2014 | Thore |
| 2017/0205522 A1* | 7/2017 | Thore .................... G01V 1/308 |
| 2018/0003840 A1* | 1/2018 | Blanchard .............. G01V 1/308 |

FOREIGN PATENT DOCUMENTS

| | | |
|---|---|---|
| GB | 2479347 A | 10/2011 |
| GB | 2528129 A | 1/2016 |
| WO | WO-9964896 A1 | 12/1999 |
| WO | WO-0048022 A1 | 8/2000 |
| WO | WO-2010139998 A2 | 12/2010 |
| WO | WO-2012010790 A2 | 1/2012 |
| WO | WO-2012038647 A1 | 3/2012 |
| WO | WO-2016005598 A1 | 1/2016 |

OTHER PUBLICATIONS

Sun et al., Separating Diffraction in 3D Plane-Wave Domain: A Physical Model Example, 2013 Annual Meeting SEG Houston, pp. 4049-4053.*

Fernandes, Paulo, "International Search Report," prepared for PCT/EP2015/065908, dated Sep. 24, 2015, four pages.
Fomel, Sergey, "Applications of Plane-Wave Destruction Filters," Geophysics, vol. 67, No. 6, Nov. 2002, pp. 1946-1960.
Fernandes, Paulo, "International Search Report," prepared for PCT/EP2015/065909; dated Sep. 24, 2015, three pages.
U.S. Appl. No. 15/324,400, filed Jan. 6, 2017, Thore et al.
Fernandes, Paulo, "International Search Report," prepared for PCT/GB2015/050008, dated Sep. 24, 2015, three pages.
Landro, Martin, et al., "Quantitative estimation of compaction and velocity changes using 4D impedance and traveltime changes," Geophysics, vol. 69, No. 4, Jul.-Aug. 2004, pp. 949-957.
Roste, Thomas, et al., "Estimation of layer thickness and velocity changes using 4D prestack seismic data," Geophysics, vol. 71, No. 6, Nov.-Dec. 2006, pp. S219-S234.
Herwanger, Jorg, et al., "Anisotropic velocity changes in seismic time-lapse data," Annual Meeting, SEG/San Antonio, Extended Abstracts, Sep. 2007, pp. 2883-2887.
Herwanger, Jorg, et al., "Linking reservoir geomechanics and time-lapse seismics: Predicting anisotropic velocity changes and seismic attributes," Geophysics, vol. 74, No. 4, Jul.-Aug. 2009, pp. W13-W33.
Fuck, R.F., et al., "Theory of traveltime shifts around compacting reservoirs: 3D solutions for heterogeneous anisotropic media," Geophysics, vol. 74, No. 1, Jan.-Feb. 2009, pp. D25-D36.
Vesnaver, Aldo L., et al., "Case History, Time-lapse tomography," Geophysics, vol. 68, No. 3, May-Jun. 2003, pp. 815-823.
Thomsen, Leon. "Weak Elastic Anisotropy," Geophysics, vol. 51, No. 10, Oct. 1986, pp. 1954-1966.
Migration in practice, Kirchhoff Migration, version 1.0 released Jan. 29, 1999, URL: http://www.xsgeo.com/course/mig.htm#kirk, Retrieved: Jan. 18, 2018.

* cited by examiner

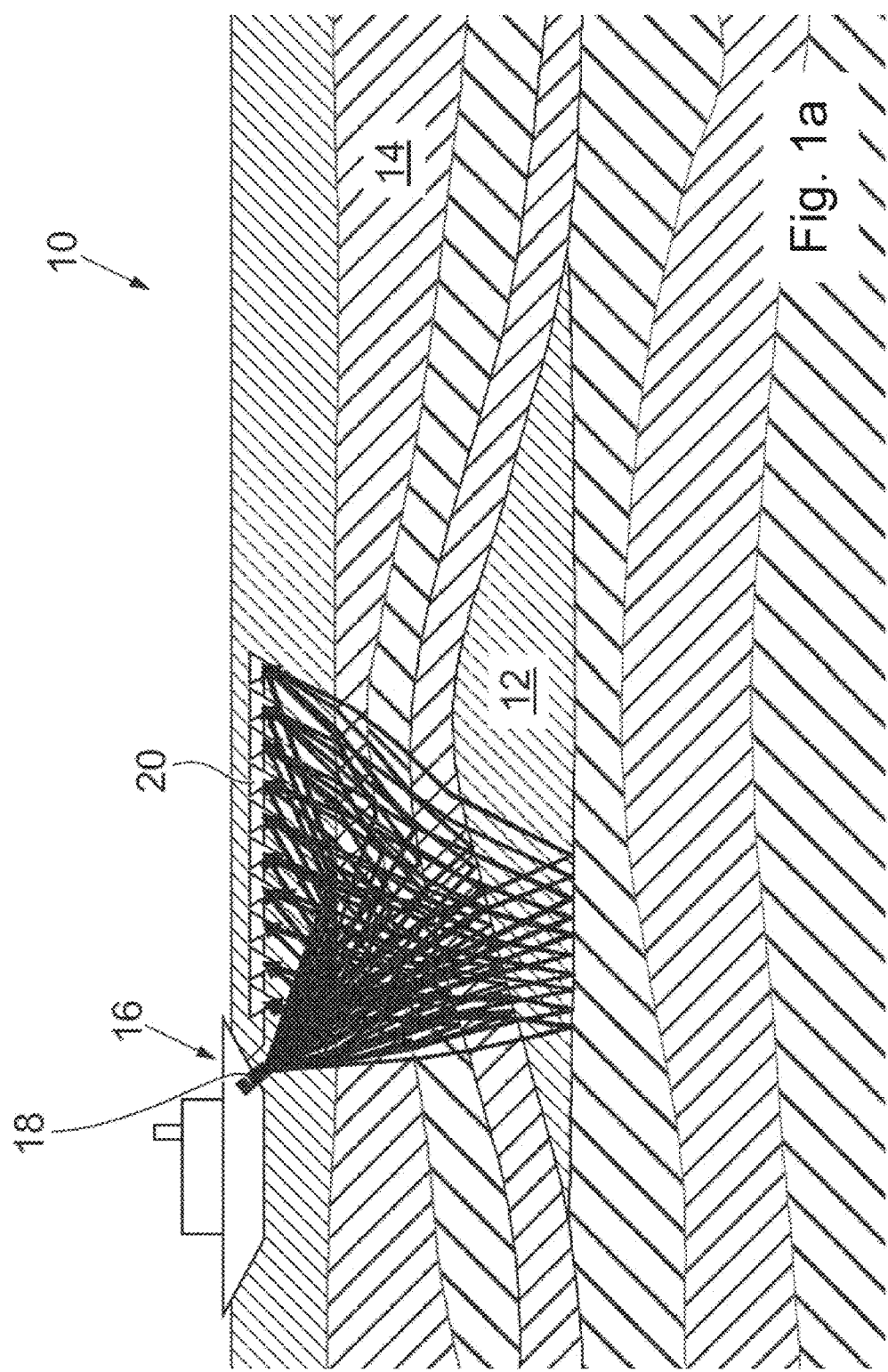

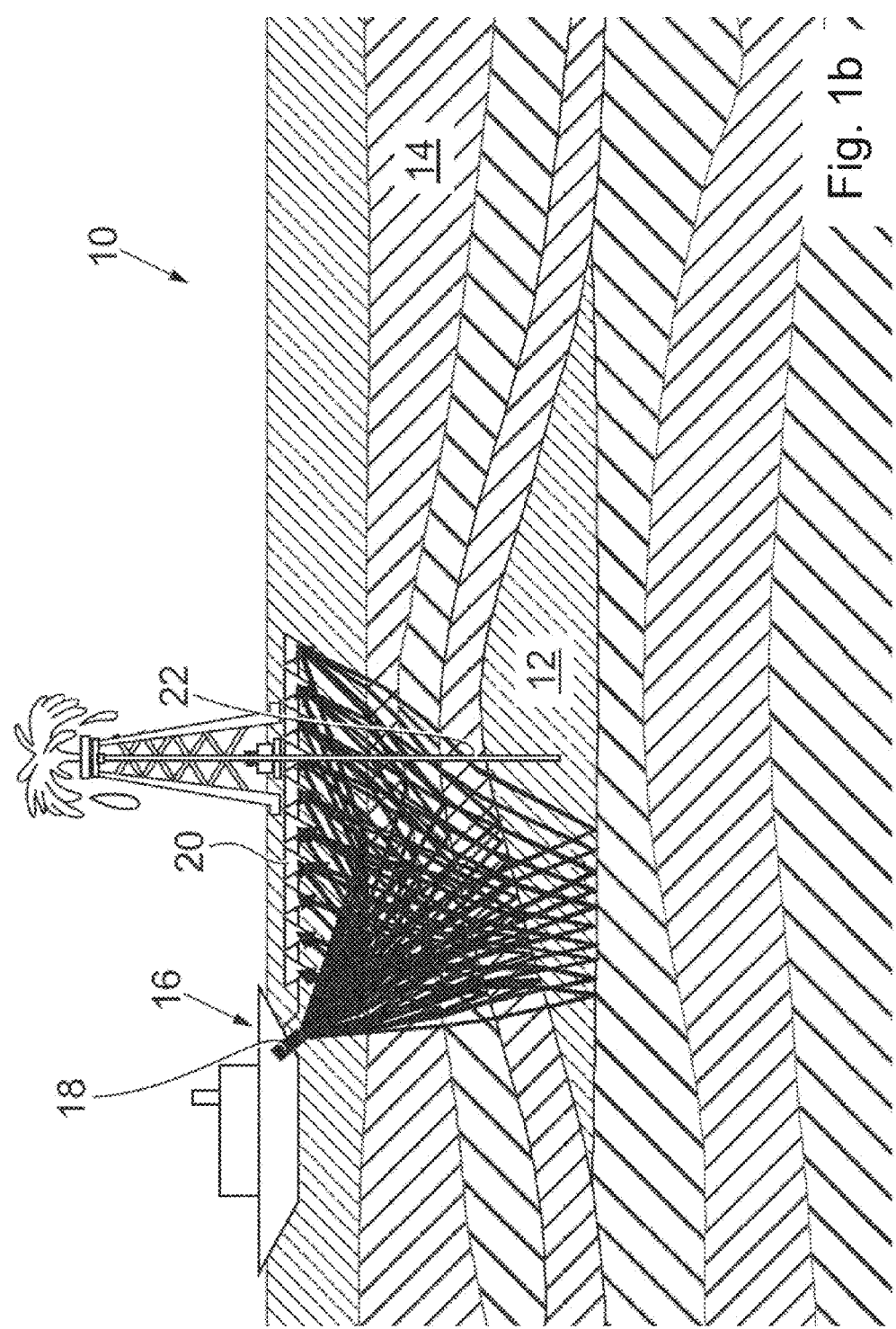

METHOD FOR OBTAINING ESTIMATES OF A MODEL PARAMETER SO AS TO CHARACTERISE THE EVOLUTION OF A SUBSURFACE VOLUME

The present invention relates generally to the field of geosciences and more particularly to seismic data processing. Specifically the invention relates to a method for obtaining estimates of a model parameter (such as time shift, velocity change or time strain) so as to characterise the evolution of a subsurface volume over a time period.

In the oil and gas industry, seismic surveys are carried out in order to provide subsurface images so that accumulations of hydrocarbons or other fluids might be identified. In a seismic survey, one or several sources emit elastic waves in the form of pressure or ground motion modulation from specific locations (wavefield), at or below the land or sea surface or in a borehole. This wavefield propagates away from the source(s) through the subsurface. Along with this propagation, a fraction of the incident wavefield is reflected from the heterogeneities in the elastic material properties of the subsurface (such as acoustic impedance). This excitation by the incident wavefield generates a reflected wavefield from the heterogeneities, which manifests as pressure, particle motion or some derived quantities and can be detected and recorded at the surface or in a borehole at a number of receiver locations.

Processing of the measurements is undertaken so as to construct a 3D image of the subsurface. Repeated surveys at selected time intervals (days, months, years) allow observation of the changes in, over or under a given reservoir across the time interval—e.g. before oil or gas production starts and after some period of production or injection and to compare the results of measurements. This is called 4D seismic and involves comparing 2D or 3D seismic surveys carried out at different time instances. The aim is to observe changes in the state of the formations and fluids consequent upon production of hydrocarbons from or the injection of fluids into a reservoir. Proper detection of the changes and proper identification of the effects, factors and processes requires specialised acquisition techniques and data processing steps.

The data within the seismic data sets may be first processed to compensate for variations in acquisition (or non-repeatability of seismic surveys) and changes in velocity in the sub-surface.

In EP 1 865 340 to the Applicant, and incorporated herein by reference, the evolution of an oil reservoir in the process of producing is carried out by jointly inverting for the changes in the propagation times and seismic amplitudes of a seismic wavelet along propagation paths in the ground. Inverting allows to back filter, in effect, deriving the original from the solution. A base survey of the reservoir is provided, with a set of seismic traces at a first time T associated to a first velocity field $V_b$; a monitor survey of the reservoir is provided, the monitor survey being taken at a second time T+ΔT, with a set of seismic traces associated to the same positions as in the base survey; the monitor survey is associated to a second velocity field $V_m$. For a set of samples i in the base survey, one computes over the samples of the set the sum S of a norm of the difference between:
- the amplitude $b_i$ of the seismic trace in the base survey at each sample i and
- the sum of the amplitude $m_i'$ of the seismic trace at a time-corresponding i' in the monitor survey and the amplitude due to the reflectivity change local to the time-corresponding sample i' induced by the difference between the first velocity field $V_b$ and the second velocity field $V_m$; the time-corresponding sample i' being shifted in time by a time-shift derived from the velocity changes along the propagation path from the surface to time-corresponding sample i'. This sum is minimised to derive the velocity changes from the base survey to the monitor survey and thus characterise the evolution of the reservoir.

This analysis is based on the fact that changes in the reservoir, due to exploitation, will cause changes to the petrophysical properties of the rock and therefore to the seismic velocity field. Practically, oil will be substituted by gas or water and/or the fluid pressure will change, modifying saturation, porosity, permeability and pressure, and consequently in velocity. Changes within the reservoir may also perturb the stress and strain state of the surrounding rocks, further altering their velocities. These changes to velocity will produce time shifts in the seismic response of underlying reflectors and associated changes in reflectivity, causing an alteration of the local wavefield. By using an inversion technique, for every point in the 3D volume, an estimate of the 4D changes having occurred in the time lapse between collection of the base and monitor surveys is provided. It is therefore possible to deduce a field of 4D velocity changes without having to proceed with cross correlation of the traces.

Although the 4D inversion problem appears relatively easy to formulate as the minimisation of a difference between base and monitor seismic data, it is an ill-posed problem that has multiple solutions: for instance, any smooth zero-mean velocity changes map into zero time-shift and does not generate any 4D amplitude difference. Moreover the inversion becomes even more highly non-linear for fields that induce subsidence and have potentially large time shift.

In EP 1 865 340, the crucial step is in minimising the difference between base and monitor seismics. Essentially this is an optimisation problem which requires minimising of the objective function or cost function over all choices of variables i.e. velocity changes that satisfy the modelled constraints. Usually the cost function is computed over all the available time-samples but it can be also calculated for decimated time samples or the sample number can be increased by interpolation to improve the accuracy of the solution.

However, as in almost any inverse problem, this cost function does not go identically to zero. In fact the forward model used for this inversion, is just an approximation which implies some assumptions, and therefore a residual still exists. To partially overcome this problem a constraint is added to the cost function. However, it is difficult to choose an optimal weight for this constraint. Several strategies can be used and a lot of interpretation is required, meaning that the solution is not unique.

The problem of estimating time shifts in 4D seismic data in the overburden (where a signal originates from the geomechanical effects and no amplitude change exists) has been studied for over 10 years. Non-linear inversion (warping) techniques such as described above, comprise one approach that has been used to address this problem. Such techniques can struggle to accurately estimate large shifts due to cycle skipping. Other techniques include local cross-correlation and image processing warping, but these techniques also have their drawbacks.

It is desirable to provide a non-linear inversion technique for estimating time shifts which address at least one of the drawbacks of the prior art.

SUMMARY OF INVENTION

In a first aspect of the invention there is provided a method for characterising the evolution of a subsurface volume, said method comprising:

providing a first survey of the reservoir with a first set of seismic traces corresponding to a first time;

providing a second survey of the reservoir with a second set of seismic traces corresponding to a second time;

constructing an analytic filter operable to shift one or more seismic traces in dependence of a model parameter;

performing an inversion to obtain estimates of said model parameter such that said analytic filter aligns said first survey and said second survey.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which:

FIGS. 1a and 1b are schematic illustrations of respectively, a base survey and a monitor survey being performed;

DETAILED DESCRIPTION OF THE EMBODIMENTS

Figure 2A:
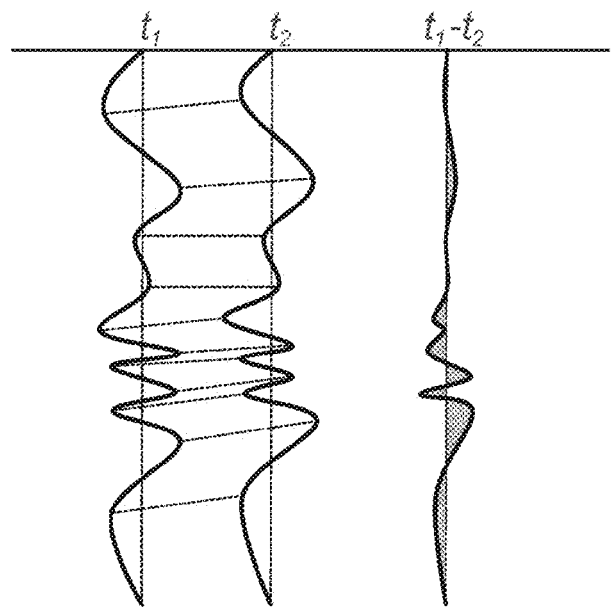
FIGS. 2a and 2b are seismic trace diagrams illustrating the principle of plane wave destruction filters.

Referring initially to FIGS. 1a and 1b there is illustrated a reservoir, generally indicated by reference numeral 10, containing hydrocarbons 12 in the sub-surface 14. A survey vessel 16, upon which is located a sonar transmitter 18, being an acoustic source, and an array of receivers 20, performs a survey by travelling over the reservoir 10. The first or initial survey, FIG. 1a, may be referred to as a base survey and is typically performed in the exploration phase before production begins.

The base survey of the reservoir 10 provides a set of seismic traces at a first time T. For a given trace, the base survey provides amplitudes that are a function of time. With digital recording and processing the trace is sampled at a set of values; typical trace lengths correspond to around 1000 samples. The trace is then handled as a set of values.

One or more wells 22 may be drilled in order to extract the hydrocarbons 12. As the reservoir 10 is produced, hydrocarbons will be substituted by other fluids and the fluid pressure will change. Additionally, enhanced oil recovery techniques may be applied wherein a fluid is injected into the reservoir at one or more locations giving changes in fluid pressure and saturation. Changes within the reservoir may also change the stress and strain state of the surrounding rocks. Thus when a further survey is carried out, FIG. 1b, these changes will be seen due to a consequential change in the velocity field. These changes to velocity will produce time shifts in the seismic expression of underlying reflectors and associated changes in reflectivity, causing a change in the local wavefield.

Thus reservoir monitoring performs a monitor survey of the reservoir 10, taken at a second time $T+\Delta T$, with a set of seismic traces. In the simplest assumption, $\Delta T$ is a positive quantity, and the monitor survey is taken at a time later than the base survey; however, the order in which the surveys are taken is irrelevant to the operation of the process of the invention and, in principle, the time lapse $\Delta T$ could as well be negative—which amounts to comparing the earlier survey to the later one. As for the base survey, a sampled trace in the monitor survey is represented as a set of values.

Ideally, the traces in the monitor survey are associated to the same positions as in the base survey. This is carried out by using, inasmuch as possible, the same equipment, acquisition geometry and processes for running the base and monitor surveys. Techniques such as interpolation may be used where traces in the monitor survey and in the base survey do not fulfil this condition.

Non-linear inversion, often referred to as warping, is a known technique for estimating time shifts from 4D base and monitor survey data in the overburden. An iterative solver is used to find a minimum (with respect to time shifts) of an objective function of the form $E=\|b-f(\Delta t)\|_p$. The vector b contains the base traces, the vector $\Delta t$ is the time shift estimate and the non-linear function $f(\Delta t)$ applies $\Delta t$ to the monitor traces. To solve for $\Delta t$ involves linearizing $f(\Delta t)$ around a $\Delta t$ estimate and solving for an incremental $\Delta t$ update. Linearization of the function $f(\Delta t)$ requires calculating its time derivative at each iteration.

It is proposed herein to utilise the theory of plane wave destruction filters, as described by Sergey Fomel, in Geophysics, 67, 1946-1960 (2002)—herein incorporated by reference) to minimise the difference between base and monitor surveys. The concepts described herein use the plane wave filter construct described by Fomel, but alters the filter parameterization from local dip to 4D time shift. Doing so generates a new set of filters suitable for aligning 4D base and monitor traces when parameterized with the correct 4D time shifts. This leads to a non-linear inverse problem for 4D time shifts which has three advantages over existing non-linear inversions for 4D time shifts:

1) Within the inverse problem the 4D time shifts are now a function of the filters, not the monitor trace. For each non-linear iteration it is necessary to only rebuild and apply the filters, which is a quick approximation to warping the monitor.
2) The filters are analytic, as are their gradients, making the Jacobian fast to calculate. Other inversions for 4D time shift must warp and numerically differentiate the monitor traces to rebuild the Jacobian at each non-linear iteration.
3) Due to the efficiency of this method, spatial regularization can be applied which reduces the 4D noise while maintain the 4D signal, without significant additional computing cost. Equivalent spatial regularization is not normally performed in 4D warping as it would slow the computation down due to the comparatively large number of iterations required to obtain a solution. Instead only regulation in the z-direction is normally performed.

In a preferred, but optional, embodiment, rather than inverting for the time shifts which align the monitor to the base, it is proposed to invert for the time shifts which move the base and monitor an equal amount in opposite directions so they align at a mid-point. This brings two further benefits:

4) The time shifts required to align the base and monitor are halved, which makes interpolation errors smaller, increases the range of time shifts for which the inversion is accurate, and reduces the number of non-linear iterations required to converge to a solution.

5) Interpolation errors are equal in both base and monitor traces, so have no contribution to the cost function.

Plane Wave Destruction

Figure 2B:
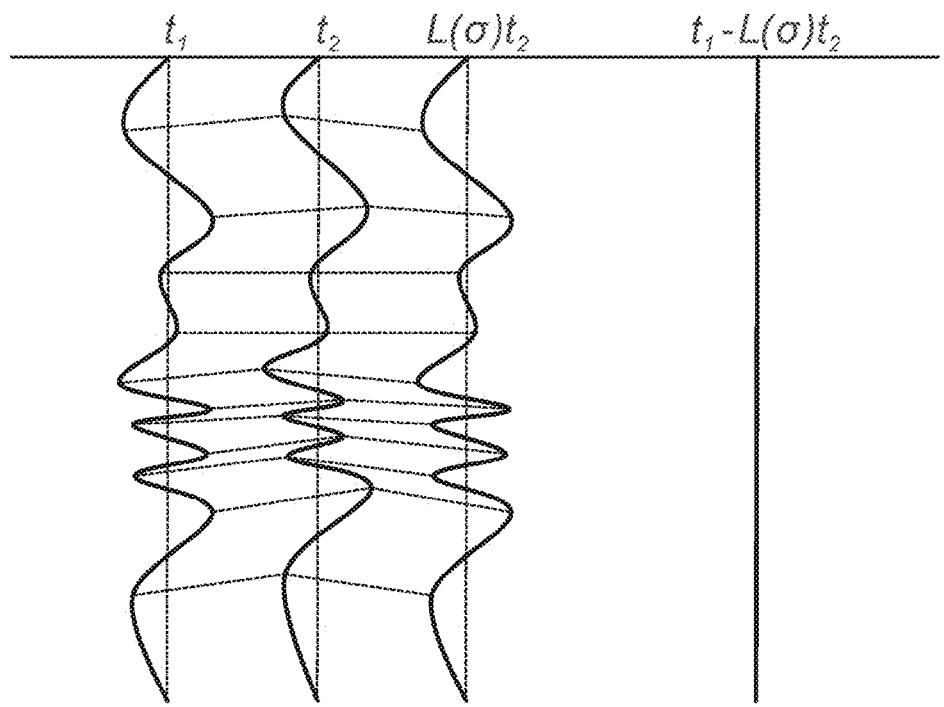

From the plane wave description of a trace it is possible to use shifts σ, to parameterise a filter $L(\sigma)$, that warps one trace to match another trace. This is illustrated in FIGS. 2a and 2b. FIG. 2a shows a first trace $t_1$ and a second trace $t_2$. Also shown is the difference between the two traces $t_2-t_1$ (the residual) without application of a filter. FIG. 2b again shows first trace $t_1$ and a second trace $t_2$. Next to this is the filtered second trace $L(\sigma)t_2$. This filtered second trace $L(\sigma)t_2$ is such that trace $t_1-L(\sigma)t_2$ is zero, as shown by the rightmost trace in this Figure (a straight line). In other words, the filter $L(\sigma)$ destroys the energy difference between plane waves $t_1$ and $t_2$, and is consequently referred to as a "plane wave destruction (PWD) filter". The system: $t_1-L(\sigma)t_2=0$, can be solved as a non-linear inversion for shifts, σ.

A PWD filter, $L(\sigma)$, maps a trace, $t_z$, to a trace, $t_1$, through shifts, σ:

$$t_1 - L(\sigma)t_2 = 0 \quad (1)$$

Representing traces as plane waves, the frequency domain $t_1$ trace, $T_1$, can be written as a function of its amplitude, $A_1$, and phase, $e^{i\theta}$:

$$T_1 = A_1 e^{i(kx-\omega t)} \quad (2)$$

For a constant time shift the frequency domain $t_2$ trace, $T_2$, can be written as:

$$T_2 = A_2 e^{i(kx-\omega(t+\sigma))} = A_2 e^{i(kx-\omega t)} e^{-i\omega\sigma} \quad (3)$$

If it is assumed that there is no energy change between $T_1$ and $T_2$, $A_1$ equals $A_2$ and:

$$T_2 e^{i\omega\sigma} = A_2 e^{i(kx-\omega t)} = T_1 \quad (4)$$

A constant shift of a plane wave is a frequency domain multiplication with phase shift operator, $e^{i\omega\sigma}$.

For time varying shifts, one option would be to perform short window Fourier transforms and invert for the optimum a per window. Instead it is proposed to find the time domain convolution filter analogue to the phase shift operator $e^{i\omega\sigma}$.

The condition of no energy change between $T_1$ and $T_2$ is met by an all pass (phase only) digital filter, which in Z-transform notation is:

$$T_2 e^{i\omega\sigma} \approx T_2(Z_t) \frac{B(Z_t)}{B(Z_t^{-1})} \quad (5)$$

For a 3-term filter:

$$\frac{B_3(Z_t)}{B_3(Z_t^{-1})} = \frac{b_{-1}Z_t^{-1} + b_0 + b_1 Z_t}{b_{-1}Z_t + b_0 + b_1 Z_t^{-1}} = \frac{b_{-1}e^{-i\omega} + b_0 + b_1 e^{i\omega}}{b_{-1}e^{i\omega} + b_0 + b_1 e^{-i\omega}} \quad (6)$$

The filter coefficients, $b_n$, can be found by fitting its response at low frequencies to that of the phase shift operator $e^{i\omega\sigma}$.

Using a Taylor expansion around zero frequency, the phase shift operator and the all pass filter can be approximated as:

$$e^{i\omega\sigma} \approx 1 + i\omega\sigma - \frac{\omega^2\sigma^2}{2} - i\frac{\omega^3\sigma^3}{6} + \ldots \quad (7)$$

-continued $$\frac{B(Z_t)}{B(Z_t^{-1})} \approx 1 - \frac{2i\omega(b_{-1}-b_1)}{b_{-1}+b_0+b_1} - \frac{2\omega^2(b_{-1}-b_1)^2}{(b_{-1}+b_0+b_1)^2} +$$

$$\frac{i\omega^3(b_{-1}-b_1)[b_0^2 - 4b_0(b_{-1}+b_1)(b_{-1}^2 - 4b_{-1}b_1 + b_1^2)]}{3(b_{-1}+b_0+b_1)^3} + \ldots$$

Equating like-terms provides a system of non-linear equations relating σ to the filter coefficients $b_n$:

$$\sigma = \frac{2(b_{-1}-b_1)}{b_{-1}+b_0+b_1} \quad \sigma^2 = \frac{4(b_{-1}-b_1)^2}{(b_{-1}+b_0+b_1)^2} \quad (8)$$

$$\sigma^3 = \frac{2(b_{-1}-b_1)[b_0^2 - 4b_0(b_{-1}+b_1)(b_{-1}^2 - 4b_{-1}b_1 + b_1^2)]}{3(b_{-1}+b_0+b_1)^3}$$

As this system does not uniquely define the coefficients, $b_n$, an additional constraint is required. An additional constraint ensures the filter $B_3(Z_t)$ does not alter the zero frequency component:

$$B_3(1) = b_{-1} + b_0 + b_1 = 1 \quad (9)$$

This also allows the system to be solved uniquely:

$$b_{-1} = \frac{(1-2\sigma)(2-2\sigma)}{12} \quad b_0 = \frac{(2+2\sigma)(2-2\sigma)}{6} \quad (10)$$

$$b_1 = \frac{(1+2\sigma)(2+2\sigma)}{12}$$

These are the coefficients for the centred 3-term PWD filter, which is the time domain analogue of the frequency domain phase shift operator:

$$Te^{i\omega\sigma} \approx \sum_{n=-1}^{1} b_n(\sigma) t_{s-n} = L(\sigma)t \quad (11)$$

where s is the time sample index (running from 1 to the number of samples) of trace t. The time domain filter can be parameterised with a different a at every time sample.

The PWD filter derivation of equations (5) through (10) follows precisely the method of Fomel (2002) wherein a equals the local dip from one trace to its neighbour. Local dip can be defined as the ratio of time shift to horizontal shift required to align neighbouring traces. Rather than predicting one trace from its neighbour, the 4D time shift estimation problem can be thought of as predicting a base trace from a collocated monitor trace by shifting it along local time shifts. The filter that performs such shifting is analogous to that defined by equation (10), with the local slope term, σ, replaced by the local time shift, Δt:

$$b_{-1} = \frac{(t - 2\Delta t)(2t - 2\Delta t)}{12t^2} \quad (12)$$

$$b_0 = \frac{(2t + 2\Delta t)(2t - 2\Delta t)}{6t^2}$$

$$b_1 = \frac{(t + 2\Delta t)(2t + 2\Delta t)}{12t^2}$$

The coefficient t is the time sampling rate of the data and allows the local time shifts, Δt, to be expressed in real time units. Note that the filter described by coefficients in Equation (12) is that required to shift the monitor to the base, or indeed the base to the monitor. The preferred embodiment is to invert for the time shifts which move the base and monitor an equal amount in opposite directions so they align at a mid-point, thereby exploiting the aforementioned advantages of doing so. In this case the filter coefficients become:

$$b_{-1} = \frac{(t - \Delta t)(2t - \Delta t)}{12t^2} \quad (13)$$

$$b_0 = \frac{(2t + \Delta t)(2t - \Delta t)}{6t^2}$$

$$b_1 = \frac{(t + \Delta t)(2t + \Delta t)}{12t^2}$$

Knowing the coefficients $b_n$ (equation 13) allows us to construct a non-linear inversion for $\Delta t$:

$$L(-\Delta t)t_b - L(\Delta t)t_m = [L(-\Delta t) \quad -L(\Delta t)]\begin{bmatrix} t_b \\ t_m \end{bmatrix} = C(\Delta t)a = 0 \quad (14)$$

The inverse problem can be solved by iteratively updating an initial time shift estimate, $t_0$, using the linear system for incremental time shift, $\delta t$:

$$\text{diag}[C'(\Delta t_0)a]\delta t + C(\Delta t_0)a = 0 \quad (15)$$

For one pair of traces, the matrix $C(\Delta t)$ is:

$$C(\Delta t) = \begin{bmatrix} L_1(-\Delta t) & 0 & \cdots & 0 & \frac{-L_1}{(\Delta t)} & 0 & \cdots & 0 \\ 0 & L_2(-\Delta t) & 0 & \cdots & 0 & \frac{-L_2}{(\Delta t)} & 0 & 0 \\ 0 & 0 & \ddots & 0 & 0 & 0 & \ddots & 0 \\ 0 & \cdots & 0 & L_s(-\Delta t) & 0 & \cdots & 0 & \frac{-L_s}{(\Delta t)} \end{bmatrix} \quad (16)$$

The PWD filter, $L_s(\Delta t)$, at each sample index, $s$, is:

$$L_s(\Delta t) = \begin{bmatrix} \frac{(t - \Delta t_{s-1})}{12t^2} & \frac{(2t + \Delta t_s)}{6t^2} & \frac{(t + \Delta t_{s+1})}{12t^2} \\ \frac{(2t - \Delta t_{s-1})}{12t^2} & \frac{(2t - \Delta t_s)}{6t^2} & \frac{(2t + \Delta t_{s+1})}{12t^2} \end{bmatrix} \quad (17)$$

$C'(\Delta t)$ is the differentiation of $C(\Delta t)$ with respect to $\Delta t$:

$$C'(\Delta t) = \begin{bmatrix} L'_1(-\Delta t) & 0 & \cdots & 0 & \frac{-L'_1}{(\Delta t)} & 0 & \cdots & 0 \\ 0 & L'_2(-\Delta t) & 0 & \cdots & 0 & \frac{-L'_2}{(\Delta t)} & 0 & 0 \\ 0 & 0 & \ddots & 0 & 0 & 0 & \ddots & 0 \\ 0 & \cdots & 0 & L'_s(-\Delta t) & 0 & \cdots & 0 & \frac{-L'_s}{(\Delta t)} \end{bmatrix} \quad (18)$$

Where $L_s'(\Delta t)$ is the differentiation of $L_s(\Delta t)$ with respect to $\Delta t$:

$$L'_s(\Delta t) = \begin{bmatrix} \frac{2\Delta t_{s-1} - 3t}{12t^2} & \frac{-\Delta t_s}{3t^2} & \frac{2\Delta t_{s+1} + 3t}{12t^2} \end{bmatrix} \quad (19)$$

Substituting $G=\text{diag}[C'(\Delta t)a]$, $d=-C(\Delta t)a$, gives the formal least squares solution of equation 15:

$$\delta t = (G^T G)^{-1} G^T d \quad (20)$$

However, the inversion is unstable. $G^T d$ and $G^T G$ are diagonal and there is noise in the system. To stabilise the inversion a regularizing operator, R can be used to force correlation between model parameters:

$$G\delta t = d \rightarrow \begin{bmatrix} G \\ \lambda R \end{bmatrix} \delta t \approx \begin{bmatrix} d \\ 0 \end{bmatrix} \quad (21)$$

The regularizing operator, R, may comprise a Tikhonov regularization operator which acts on all elements in $\delta t$. Its impact is controlled by the parameter $\lambda$. This can be used to force $\delta t$ to have some property, such as low energy or smoothness.

It is possible to recast the inversion to solve for time strain, u, by recognising that the time shift, $\Delta t(x)$, at time $x=T$ is:

$$\Delta t(T) = t \sum_{x=0}^{T} u(x) \quad (22)$$

Substituting this into the inversion yields:

$$\begin{bmatrix} GS_z \\ \lambda RS_z \end{bmatrix} \delta u \approx \begin{bmatrix} d \\ 0 \end{bmatrix} \quad (23)$$

Where $S_z$ maps $\delta u$ to $\delta t$ by performing the running sum of $\delta u$ in the z-direction before multiplying by the time sampling rate, t.

Practical Application

Figure 3:
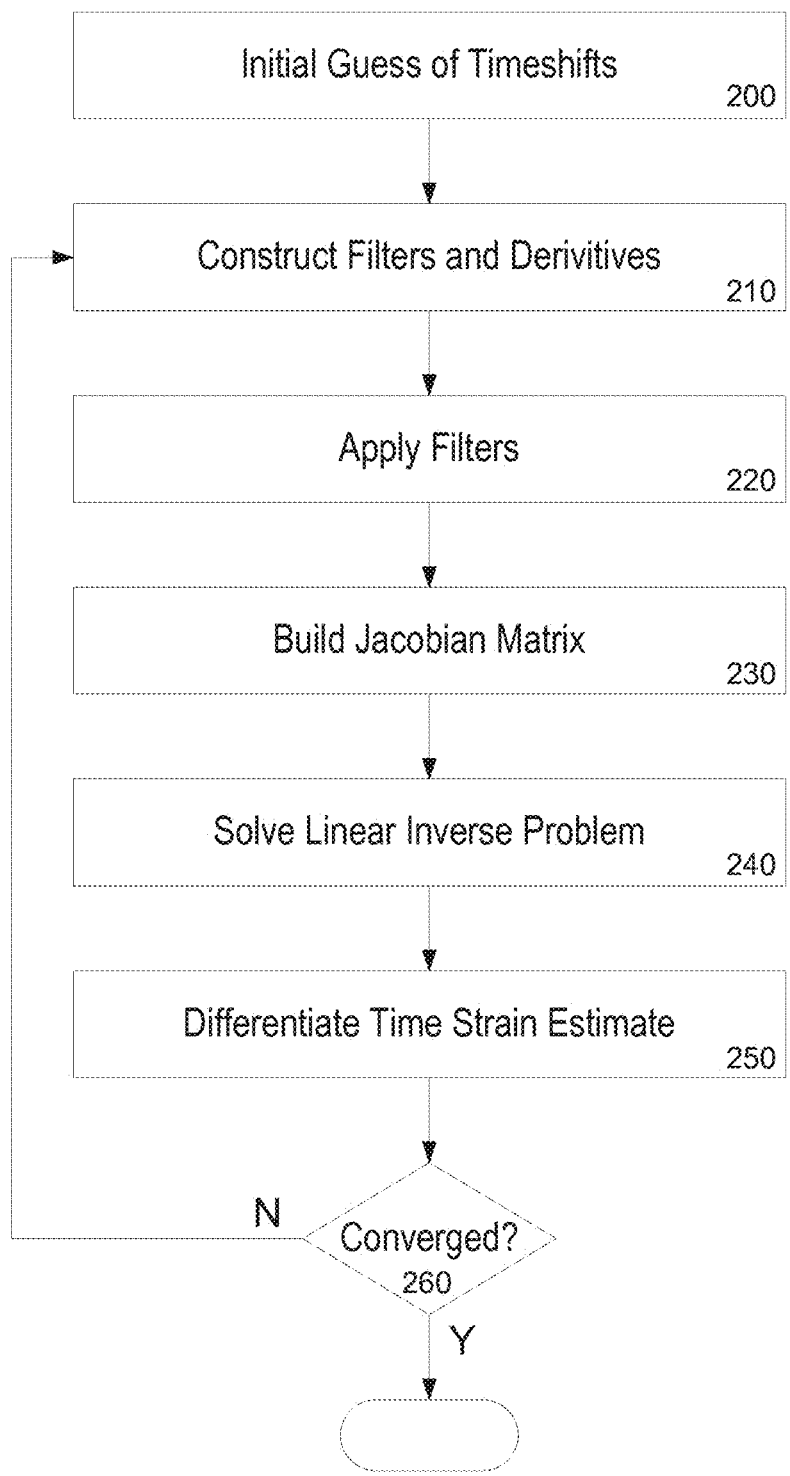
FIG. 3 is a flowchart describing a method according to an embodiment of the invention.

FIG. 3 is a flowchart describing a practical embodiment of the techniques described above. The method uses a Gauss-Newton scheme as follows:

Step 200: Make an initial guess of the time shifts (usually zero).

Step 210: Construct the time shift filters and their derivatives from the current time shift model, $\Delta t_i$ (where $i|i \in N$, $0 \leq i \leq N$ and indicates to the current non-linear iteration number). The filter coefficients are those of Equation (13). While these are described in relation to single traces $t_b$, $t_m$, the objective function is cast in terms of vectors b and m, which comprise all base and monitor traces respectively. The unregularized objective function to be minimised may take the form:

$$0 = \|L(-\Delta t)b - L(\Delta t)m\|_2 \quad (24)$$

where L is a non-stationary, phase-only filter parameterised by vector $\Delta t$ representing all the time shifts. It should be noted that Equation (24) shifts both sets of base and monitor traces by equal amounts in opposite directions, bringing them to common midpoints in time. This is optional, and shifting the monitor to the base, or indeed the base to the monitor, is envisaged within the scope of this disclosure. As already described, the filter has an analytic expression derived from the plane wave model of a seismic trace, and has an analytic gradient. Here, the three-term filter coefficients are described by Equation (13) and the coefficients of the derivative of the three term filter are described by Equation (19).

Step 220: Generate the data residuals for the current iteration, $d_i$, by applying the time shift filters to the base and monitor data in the following way:

$$[L(-\Delta t_i) \quad -L(\Delta t_i)]\begin{bmatrix}b\\m\end{bmatrix}=d_i \quad (25)$$

Step 230: Build the Jacobian matrix, $G_i$, by applying the filter derivatives to the base and monitor data and diagonalizing the result.

$$\text{diag}\left\{[L'(-\Delta t_i) \quad -L'(\Delta t_i)]\begin{bmatrix}b\\m\end{bmatrix}\right\}=G_i \quad (26)$$

Step 240: Solve the linearized inverse problem for an incremental time shift update, $\delta t_i$:

$$G_i \delta t_i = -d_i \quad (27)$$

Iterating through this process provides local time shifts which align the base and monitor data. However, the time shift at a particular subsurface location is an accumulation of all time shifts down to that point, and not just a local anomaly. To understand the physical cause of an unobserved time shift, it should preferably be an integrated measurement. Changing the inversion model parameters from time shifts, $\Delta t$, to time strains, $\Delta u$, provides a more physically understandable output which is better suited to geomechanical modelling. This can be done by substituting the relationship between time shift and time strain expressed by Equation (22) into Equation (27). Additionally, one or more regularisation terms may be added to stabilise the inversion in the presence of noise.

Recasting Equation (27) in terms of time strain and adding Tikhonov regularization yields:

$$\begin{bmatrix}G_i t \nabla_z^{-1}\\ \lambda_z \\ \lambda_x \nabla_x \\ \lambda_y \nabla_y \end{bmatrix}\delta u_i = \begin{bmatrix}d_i\\0\\0\\0\end{bmatrix} \quad (28)$$

Where the operator $\nabla$ produces the gradient in the direction specified by the subscripts x, y and z. Naturally, the inverse of this operator performs integration.

The weighting terms $\lambda$ control the severity of the model damping in each of the subscripted directions. Iterating using Equation (28) provides spatially smooth time strains and vertically smooth accumulated time shifts which align the base and monitor data. Equations (23) and (28) are equivalent when the regularization operator R is chosen to be the 3D gradient, $\nabla_{xyz}$. The result is well suited for building geomechanical models. Using this formulation, all variants of the existing warping methods can be implemented, e.g. multi-monitor warping as disclosed in WO2010/139998, or layered based approaches such as Propagation 4D as disclosed in WO2012/038647. Both of these documents are hereby incorporated by reference.

Step 250: Differentiate the time strain estimate to give an incremental time shift update (where the inversion model parameters were changed to time strains) for adding to the current time shift model. At each iteration, the inverted $\delta t_i$ is added to the current time shift estimate $\Delta t_i$, to give an updated set of time shifts $\Delta t_{i+1}$.

Step 260: Repeat steps 200 to 250 until convergence.

In an optional embodiment, it is proposed to stabilise the inversion described herein using a novel regularization method. In this regularization method, it is proposed to apply constraints per region of subsurface volume, the regions defined according to a high order discrete property (e.g. geomechanical facies) attributed thereto in accordance with the region's geologic characteristics. Regions attributed with the same high order discrete property can be assumed to have similar geomechanical properties.

One way of applying constraints per region defined according to a high order discrete property is to define velocity changes (or time stain or time shifts depending on the chosen parameterization) as a regional function defined by a limited number of parameters at each position per region (e.g. layer or group of layers) used in geomechanical modelling. Geological surfaces can be used to divide the model space into layers (or strata) of geomechanical facies (rocks with similar geomechanical properties). Coefficients of a regional function are then inverted for at each spatial location within a layer. The regional function describes how an elastic property, such as time strain, varies within each region (e.g. layer). The inversion forward modelling operator includes the regional function, which expands the coefficients at each spatial location into the desired property, such as time strain, at every seismic sample point within the region/layer. Determination of layer positions (through geological interpretation) does not need to be very accurate for measurements within the overburden/underburden as the wavelength of the geomechanical property variation are very long.

A simple example of a regional function is constant time strain per region or layer, in which case only a single coefficient is required at each spatial location within a region/layer. However other regional functions may also be appropriate depending on the subsurface geology. Therefore the constraint enables inversion within each region or layer using any function. The example below explains this method of geological constraints applied to an inversion for time strain from noisy 4D seismic, but the regularization method is general to any 4D seismic inversion (for geomechanical or elastic properties).

Introducing geological layer constraints into equation (28), without the Tikhonov regularization, gives:

$$G_i t \nabla_z^{-1} H \delta \hat{u}_i = d_i \quad (29)$$

The new model parameters, $\hat{u}$, are layer-dependent coefficients of a function, H, which is evaluated at every sample point. Geological surfaces are used to define the layers of geomechanical facies; rocks that can be assumed to have similar geomechanical properties. The simplest expression of this constraint is that time strain is constant within each layer, but any layer-dependent rock mechanics relationships could be expressed by $H\hat{u}$.

For the case of constant time strain per layer, $\hat{u}$ is a single time strain value at each spatial location per layer. The mapping operator, H, for each trace location is built of N matrix blocks, each with N columns, where N is the number of layers. The number of rows per block varies according to the number of z-samples in the corresponding layer. Each block has a single column of ones, which is found in the first column for the first block, the second column for the second block, and so on. All other elements are zero. The final matrix, H, is a vertical concatenation of the blocks. Under these circumstances the action of $\nabla_z^{-1} H$ can be expressed by:

$$\delta t(T) = \delta u(J)\left(T - \sum_{j=1}^{J-1} x(j)\right) + \sum_{j=1}^{J-1} \delta u(j)x(j) \quad j \mid j \in \mathbb{N}, j \le J \quad (30)$$

Where $\delta t(T)$ is the incremental time shift at two way time T, $\delta \hat{u}(j)$ is the time strain in layer j, x(j) is the time thickness of layer j, and the index j runs from one up to the layer J in which time T exists.

Equation (29) can be further regularized using classical Tikhonov methods to give:

$$\begin{bmatrix} G_i t \nabla_z^{-1} H \\ \lambda_j \nabla_j \\ \lambda_x \nabla_x \\ \lambda_y \nabla_y \end{bmatrix} \delta \hat{u}_i = \begin{bmatrix} d_i \\ 0 \\ 0 \\ 0 \end{bmatrix} \quad (31)$$

It is important to note that the lateral smoothing action of $\lambda_x \nabla_x$ and $\lambda_y \nabla_y$ in equation (31) takes place within geological layers by construction, thereby following layer dip. The vertical smoothing governed by $\lambda_j \nabla_j$ occurs across layer boundaries and guards against the estimated model parameters swinging (successive over- and under-estimation) from one layer to the next. This constraint is not applied for reservoir layers.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects of surveillance, monitoring, optimisation and prediction of a subsurface volume comprising a hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention.

The invention claimed is:

1. A method for characterising evolution of a subsurface volume comprising at least one of a hydrocarbon reservoir and well system, said method comprising:
    obtaining, via at least one acoustic source and an array of acoustic receivers, a first survey of the subsurface volume with a first set of seismic traces corresponding to a first time;
    obtaining, via the at least one acoustic source and the array of acoustic receivers, a second survey of the subsurface volume with a second set of seismic traces corresponding to a second time;
    constructing an analytic filter operable to shift at least one seismic trace in dependence of time shift, wherein said analytic filter comprises an all-pass plane wave destruction filter parameterized by time shifts and is a time domain analogue of a frequency domain phase shift operator operable to impose a constant time shift to a plane wave model of a seismic trace;
    performing an inversion to obtain time shift estimates for a model parameter such that said analytic filter aligns said first survey and said second survey; and
    wherein said time shift estimates characterize the evolution of the subsurface volume comprising at least one of a hydrocarbon reservoir and well system over a time period between the first time and the second time.

2. The method as claimed in claim 1, wherein said analytic filter is such that said model parameter is a function of said analytic filter and is not a function of at least one of said second set of seismic traces.

3. The method as claimed in claim 1, wherein said analytic filter comprises a plane wave destruction filter.

4. A method as claimed in claim 1, wherein said analytic filter is a time domain analogue of a frequency domain phase shift operator operable to impose a constant time shift to a plane wave model of a seismic trace.

5. The method as claimed in claim 1, wherein filter coefficients of said analytic filter are non-stationary with respect to time and space coordinates.

6. The method as claimed in claim 1, wherein said model parameter is at least one of: time shift, time strain or velocity change.

7. The method as claimed in claim 1, wherein said method comprises the steps of:
    constructing said analytical filter and their derivatives from a current model parameter model; and
    iteratively updating an initial model parameter estimate with an incremental model parameter update until convergence on a solution.

8. The method as claimed in claim 7 wherein the step of iteratively updating an initial model parameter estimate comprises:
    applying said analytical filter to at least one of said first survey and said second survey to generate residuals;
    building a Jacobian matrix by applying the derivatives of the analytical filter to said first survey and said second survey and diagonalizing a result; and
    iteratively solving a linear inverse function constructed from said residuals and said Jacobian matrix.

9. The method as claimed in claim 7, wherein:
    said model parameter comprises time shift such that said analytic filter is parameterized by time shifts and the model parameter model is a time shift model, and
    a conversion to time strains is performed prior to the inversion, a resultant time strain estimate being converted back to an incremental time shift update and used to update the time shift model.

10. The method as claimed in claim 1, wherein the inversion is regularized spatially in three directions.

11. The method as claimed in claim 1, wherein the inversion comprises shifting each of said first survey and said second survey to a common midpoint.

12. The method as claimed in claim 1, wherein said subsurface volume is divided into regions according to a high order discrete classification attributed in accordance with a particular region's geologic characteristics, and said inversion is constrained per region of subsurface volume.

13. The method as claimed in claim 12, wherein said regions comprise geological layers and said high order discrete classification comprises facies.

14. The method as claimed in claim 12, wherein said inversion comprises inverting for coefficients of a regional function at each spatial location within a region, wherein said regional function describes how a property varies within a region.

15. The method as claimed in claim 14, wherein said coefficients of the regional function are region-dependent coefficients, said region-dependent coefficients being dependent on the region of subsurface volume they correspond to.

16. The method as claimed in claim 14, wherein said regional function comprises a forward modelling operator imposing a region-dependent constraint, said region-dependent constraint being dependent on the region of subsurface volume.

17. The method as claimed in claim 16, wherein said forward modelling operator expands the coefficients of the regional function at each spatial location to every seismic sample point within the region.

18. The method as claimed in claim 16, wherein the region-dependent constraint is that the model parameter is constant within each region.

19. The method as claimed in claim 1, further comprising the step of using results of said method to aid hydrocarbon recovery from a reservoir.

20. The method as claimed in claim 1, further comprising the step of using the estimates of said model parameter in prediction of future evolution of said subsurface volume.

21. A computer-program product comprising a non-transitory computer-usable medium having computer-readable program code embodied therein, the computer-readable program code adapted to be executed to implement a method comprising the steps of claim 1.

* * * * *